H. M. LAMBERT.
METHOD OF MANUFACTURING BELTS.
APPLICATION FILED SEPT. 11, 1919.
1,412,310.
Patented Apr. 11, 1922.
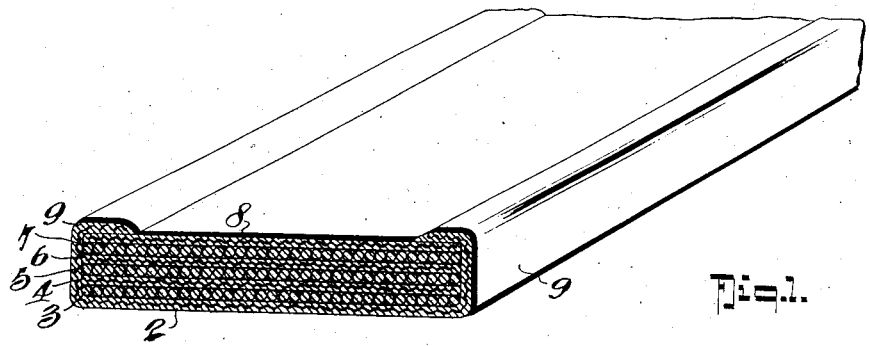
Fig. 1.
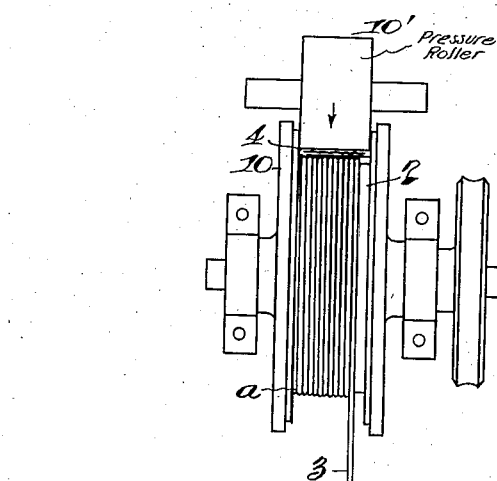
Fig. 2.
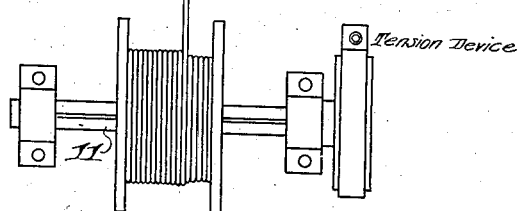
INVENTOR
H. M. Lambert.
BY
Fred G. Dieterich Co.
ATTORNEYS

UNITED STATES PATENT OFFICE.

HENRY M. LAMBERT, OF PORTLAND, OREGON, ASSIGNOR TO LAMBERT TIRE & RUBBER COMPANY, OF PORTLAND, OREGON, A CORPORATION OF ARIZONA.

METHOD OF MANUFACTURING BELTS.

1,412,310.   Specification of Letters Patent.   Patented Apr. 11, 1922.

Application filed September 11, 1919. Serial No. 323,067.

*To all whom it may concern:*

Be it known that I, HENRY M. LAMBERT, a citizen of the United States, residing at Portland, in the county of Multnomah and State of Oregon, have invented a new and Improved Method of Manufacturing Belts, of which the following is a specification.

This invention, which relates to the art of belt manufacture, has for its object to provide a method of making a substantially non-stretchable, yet flexible, belt which may be of general utility, although the same is especially found useful in automobile tires of the so-called "solid" type.

The belt formed by my method consists generally of longitudinally extending cords laid under tension in single layers, superposed and stretched to their approximate limit of elongation while being laid, and layers of fabric between the layers of cord and adhesively bound thereto.

One of the forms of the invention is illustrated in the accompanying drawing to which reference is made and in which:

Figure 1 is a perspective view of a portion of the belt or strap in cross section.

Figure 2 is a diagrammatic view, showing a type of apparatus used in the method of producing an endless belt of one form.

In Figure 1, a portion of the belt A is shown, which comprises a base or foundation 2 of a sheet or strip, which is preferably of a substantial fabric, such, for example, as canvas, and which is preferably rubberized, or otherwise treated, so that, during the process of manufacture, the base or foundation may be adhesively bound with contiguous elements of the belt. Upon the base or foundation 2 is a layer of cords 3, preferably of some stout material, rubberized, or otherwise treated, to become adhesive. Upon the first layer of cord 3 on the foundation 2 is superposed a layer or winding of fabric 4 of such nature as to be adhesive. Upon this is superposed a layer of cord 5, covered in turn with a laminæ 6 of fabric, this being in turn covered by a layer of cord 7 which is again covered with a strip 8 of fabric. It is to be understood that as many of the alternate layers of fabric and cord may be employed as is desired, and that the fabric and cord laminæ may be of suitable material and have the desired characteristics and may be of any length or width to produce the desired size belt A.

Preferably the foundation fabric 2 is of sufficient width so that its edges may be turned perpendicular to its width so as to form binders or covers for the longitudinal edges of the laminated belt, as shown at 9—9.

In the course of manufacture, the foundation 2 is laid while under a desired degree of stress or tension, and upon this is laid the layer of cord 3; this layer also being laid while under stress or tension of desired degree. Preferably the tension of the members is such as to substantially prevent further elongation of the belt after it has been finished.

A method practiced in manufacturing the belt consists in placing the foundation member 2 upon a support or drum 10, and under suitable tension, and then winding upon the surface of the foundation 2, a cord, as 3, which is wound helically, commencing from one side of the foundation 2 and then continuing across the surface thereof to its full width. The cord is subjected to the desired tension from a suitable tensioning apparatus which may include an arbor 11, upon which the reel of the cord 3 is mounted. The drum 10 being rotated will unwind the cord from the reel; the cord binding helically and tightly the foundation 2. In this manner the cord is laid in a single piece, beginning at one end as *a*, and extending entirely across the surface of the foundation members 2; the helical binding being laid under tension throughout its length. The tension preferably is such that all of the elongation of the cord 3 has been taken up during the tensioning process so that when wound upon the foundation 2 it is substantially non-stretchable. Then upon the layer or helix of cord upon the foundation 2 on the drum 10 there is wound a layer 4 of fabric which is also laid under tension so as to prevent further elongation after the layer has been applied. Upon this layer 4 of fabric there is then wound another helix of cord, indicated at 5, Figure 1, this being placed under suitable tension also while being laid. The belting is constructed with as many alternate layers of tensioned fabric and cord as is desired to produce the required thickness.

The method adopted in the apparatus shown in Fig. 2 is designed to produce a belting of any desired diameter, width and thickness, in which each layer of cord 3 is a helix starting at one side and continuing across the width of the foundation or belt to the opposite side and laid under tension.

As the fabric layer is applied to the cord layer the mass is subjected to the desired pressure by a pressure roller 10', so that the laminæ will bind adhesively. When compiled the belt or strap is then vulcanized. The endless belt may be cut into sections of any length for straps.

It will of course be understood that the vulcanization of the belt or strap takes place while it is still under tension on the support.

This application is a continuation in part of my application filed June 4, 1918, Serial No. 238,203, and through that application is a division of my application filed July 28, 1914, Serial No. 853,617 on which Letters Patent #1,287,703 were granted December 17, 1918. In this application I make no claim to the article of manufacture as that constitutes the subject matter of my patent referred to.

What I claim is:—

1. The method of manufacturing a belt which consists of taking a base layer of fabric, winding the same on a former, taking a rubberized cord and winding the same helically around said base layer and former in adjacent coils while maintaining said cord under a tension sufficient to stretch the cord to approximately its limit of elongation, and applying pressure to the cord and fabric in a direction at right angles to the direction of the length of the cord while confining the structure in a closed channel.

2. The method of making a flat, endless belt which consists in winding a rubberized fibrous cord under strong tension in a series of adjacent convolutions on a support, and then vulcanizing the article while still under such tension on said support.

3. The method of making a flat, endless belt which consists in laying a rubberized fabric cover strip on the periphery of a forming support, winding a rubberized cord thereon under strong tension in a series of adjacent convolutions, closing the cover strip over the outer side of the body of cord strands, and vulcanizing the article while still under tension in place on the support.

4. The method of manufacturing a belt which consists of taking a base layer of fabric, winding the same on a former, taking a rubberized cord and winding the same helically around said base layer and former in adjacent coils while maintaining said cord under a tension sufficient to stretch the cord to approximately its limit of elongation, and applying pressure to the cord and fabric in a direction at right angles to the direction of the length of the cord while confining the structure against lateral and sidewise elongation, and vulcanizing the same to produce an integral structure.

HENRY M. LAMBERT.